March 28, 1939.　　　　E. T. TURNER　　　　2,152,573
AUTOMOBILE
Filed May 13, 1936　　　　2 Sheets-Sheet 2
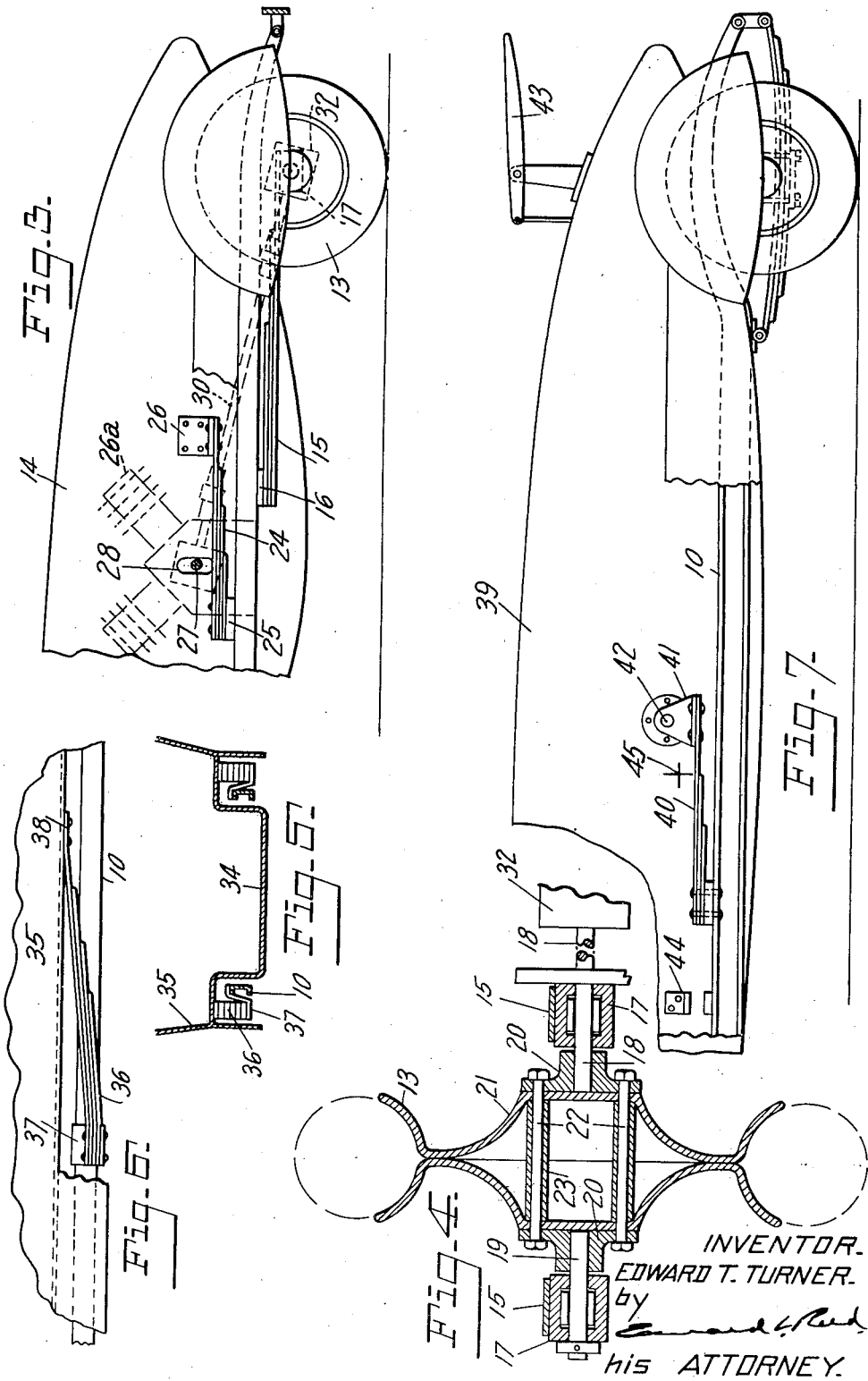

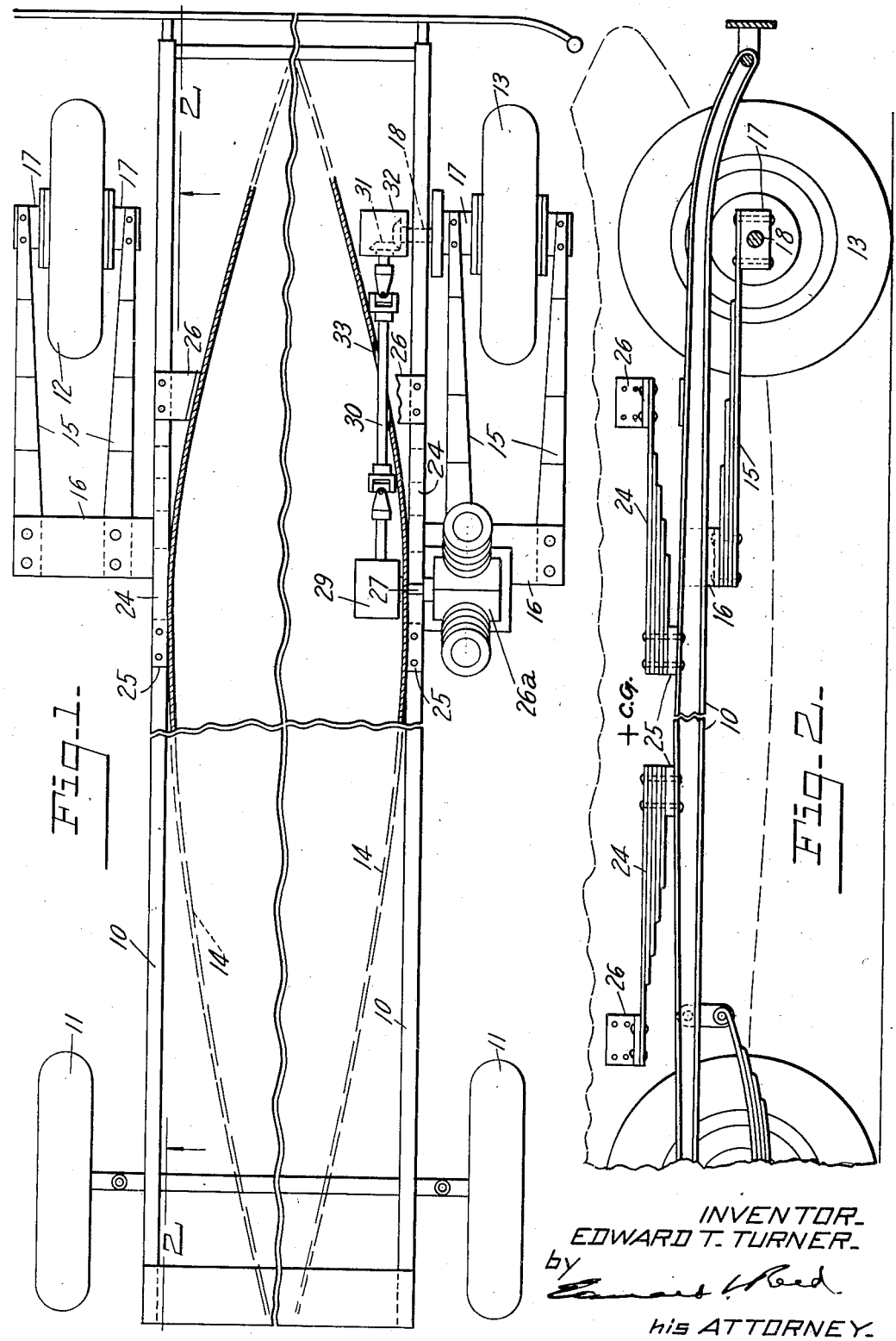

Patented Mar. 28, 1939

2,152,573

UNITED STATES PATENT OFFICE 2,152,573

AUTOMOBILE

Edward T. Turner, Dayton, Ohio

Application May 13, 1936, Serial No. 79,543

8 Claims. (Cl. 180—1)

This invention relates to an automobile and one object of the invention is to provide an automobile which will be simple and inexpensive in construction, will be of light weight and may be operated at a low cost.

A further object of the invention is to provide such an automobile in which the body will be so mounted as to provide the same with very easy riding qualities.

A further object of the invention is to provide a simple and efficient means for mounting the frame on the driving wheels.

A further object of the invention is to provide an improved arrangement of the propelling mechanism which will be simple and inexpensive.

A further object of the invention is to provide an automobile in which the driving wheels will be so mounted as to permit of their independent vertical movement and thus provide the same with full "knee action".

Other objects of the invention may appear as the apparatus is described in detail.

In the accompanying drawings Fig. 1 is a plan view, partly broken away, of the chassis of an automobile embodying my invention, with the body in section; Fig. 2 is a section taken on the line 2—2 of Fig. 1 and partly broken away; Fig. 3 is a side elevation, partly broken away, of the rear portion of the automobile shown in Fig. 1; Fig. 4 is a sectional detail view of the mounting for one of the rear wheels; Fig. 5 is a transverse sectional view of a portion of an automobile showing a modified mounting for the body springs; Fig. 6 is a detail elevation of the spring mounting shown in Fig. 5; and Fig. 7 is a side elevation of a portion of an automobile showing another form of spring mounting for the body.

In Figs. 1 to 4 of these drawings I have illustrated one embodiment of my invention, which is very simple and inexpensive in construction. In this embodiment the automobile frame comprises longitudinal side members 10, and the frame is supported at its front end on the usual steering wheels 11 and is supported at its rear end by wheels 12 and 13. Supported on the frame is an elongate streamlined body 14, the lower portion of which is arranged between and extends below the frame members and in this particular arrangement the body is of a width less than the distance between the side members of the frame.

The rear wheels 12 and 13 are separately mounted for independent movement with relation to the frame so that either wheel may ride over an obstruction or into a depression in the road without imparting tilting movement to the frame. These wheels are connected with the frame by suitable springs which constitute the sole means for supporting the frame on the wheels. While the springs may take various forms I have here shown a special form of spring which is simple and efficient in its operation. The springs for the two wheels are identical in construction and arrangement and they extend lengthwise of the frame. Each spring is secured at its forward end to the adjacent side member of the frame and comprises two rearwardly extending parts which are spaced one from the other to receive the wheel between them. In the particular construction here shown the two parts or arms 15 of each spring extend for the full length of the spring and are rigidly secured at their forward ends to a bracket 16 which in turn is rigidly secured to and extends outwardly from the side member of the frame, this bracket being spaced some distance in front of the wheel with which the spring is connected. The two arms 15 are here shown in the form of leaf springs and each is provided at its rear end with a bearing 17 to receive the adjacent portion of the wheel axle. To facilitate the removal of the wheel I have shown the axle as formed in two parts, 18 and 19, which are journaled in the respective bearings 17. The two parts of the axle have rigidly secured to their adjacent ends attaching members or plates 20 between which the hub portion 21 of the wheel is arranged. Bolts 22 extend through both attaching plates and the hub portion of the wheel to rigidly connect these parts one to the other. Preferably the wheel hub, which is hollow, is provided with guide tubes 23 to facilitate the insertion of the bolts. When these bolts have been removed the hub can be withdrawn from between the attaching plates 20 and the wheel removed. These springs constitute the sole supporting connection between the respective wheels and the frame and permit each wheel to move vertically with relation to the frame independently of the other wheel.

While the springs 15 will absorb a large part of the road shocks some of these shocks may be transmitted to the frame, and for the purpose of absorbing the shocks thus transmitted to the frame and preventing the same from reaching the body the latter is mounted for vertical movement with relation to the frame and is supported on the frame by suitable springs. These springs will absorb all or the greater part of the small part of the road shocks which are transmitted to the frame and any small shock which may reach the body will be further absorbed by the springs of the seat cushions, so that the vehicle has extremely good riding qualities. The body springs may take various forms but, as shown in Fig. 2, there are two springs 24 on each side of the body and these springs extend lengthwise of the frame and have their adjacent ends rigidly secured to the respective frame members, as shown at 25. The other or free ends of the springs may be connected with the body in any suitable manner, as by means of the usual shackles connected with brackets 26. The springs being arranged above the frame members it follows that the points of connection between the springs and the body are spaced substantial distances from the bottom of the body, thus tending to prevent any tilting or swinging movement of the body about a longitudinal axis. The springs are preferably secured to the frame members near the center of gravity of the elongate body and are so arranged that they will properly balance the body and permit it to move about a transverse axis. As shown in Fig. 2 the adjacent ends of the two springs on each frame member are secured to the respective frame members on opposite sides of the center of gravity, C. G., of the body.

Propelling mechanism for the automobile may be of any suitable character and in order that it may be of light weight and inexpensive I prefer to use a small internal combustion engine 26a which is here shown as of the V-type, such as is commonly used on a motorcycle, and is mounted on one of the side members of the frame exteriorly of the body. The shaft 27 of this engine extends through a slot 28 in the side wall of the body and is connected through suitable transmission mechanism, not shown but enclosed in casing 29, with the driving shaft 30, which in turn is connected through gears 31, enclosed in a casing 32, with the inner part 18 of the axle for the wheel 13. The body is slotted at 33 to permit the passage of the driving shaft and to permit of the vertical movement of the body with relation thereto. In the present construction I have connected the engine with the one wheel only but it will be obvious that, if desired, the engine may be connected with both wheels or that a separate engine may be provided for driving the other wheel.

In some embodiments of the invention it may be desirable to employ a body of greater width than the frame and in Fig. 5 I have shown a body the lower portion 34 of which is arranged between the frame members but the upper portion 35 of which is of greater width than and overhangs the frame members. With this type of body I prefer that the body springs shown at 36 in Figs. 5 and 6 should be connected with the frame members at points below the upper edges of the latter, as by means of brackets 37, the springs being thus arranged alongside of the frame members and the free ends of the springs having supporting connection with the overhanging part of the body, as shown at 38. This arrangement of the springs permits the body to be mounted in a much lower position than would be possible if the springs were supported on top of the frame members. There may be one or more springs on each side of the frame and preferably there are two springs on each side, arranged with relation one to the other in the manner shown in Fig. 2.

In Fig. 7 I have shown another arrangement of spring body mounting in which the body 39 is capable of pivotal movement about a transverse axis. In this arrangement a single spring is mounted on each side of the body and each of these springs, one of which is shown at 40, is rigidly secured at one end of the adjacent frame member and is provided at its free end with a bracket 41 in which is mounted a pivot pin 42 attached to the side wall of the body. The two pivot pins are in axial alinement so that the body is free to move about a transverse axis, this axis being arranged adjacent to the center of gravity of the body. Mounted on the body is an elevator plane 43 adapted to elevate the heavier end of the body when the automobile is moving at high speed and to support the same for floating movement about the transverse axis. In the arrangement shown in Fig. 7 each spring is connected to its supporting frame member a short distance in front of the center of gravity 45 of the body and the pivotal connection 42 with the body is slightly in the rear of the center of gravity so that the forward end of the body is the heavier and stops 44 are provided to limit the downward movement of this heavier end of the body when the automobile is stationary or moving at low speed. When the automobile is moving at high speed the elevator plane will depress the rear end of the body and elevate the front end thereof and will support the same for floating movement so long as the high speed is maintained.

While I have shown and described one embodiment of my invention, together with certain modifications thereof, I wish it to be understood that I do not desire to be limited to the details thereof as various modifications may occur to a person skilled in the art.

Having now fully described my invention, what I claim as new and desire to secure by Letters Patent, is:

1. In an automobile, a frame comprising side members, wheels supporting said frame, an elongate body having its lower portion arranged between said side members and adapted to have vertical movement with relation thereto, and springs mounted on the respective side members and extending lengthwise thereof, each spring being secured at one end to its supporting frame member relatively close to the center of gravity of said body and having at its other end supporting connection with said body above the bottom thereof to permit the lower portion of said body to move below said frame, said springs constituting the sole means for supporting said body on said frame.

2. In an automobile, a frame comprising side members, wheels supporting said frame, a body mounted on said frame for vertical movement with relation thereto, two springs mounted on each side member of said frame and extending lengthwise thereof in opposite directions, the springs on each side member having their adjacent ends secured to said side member, and means for connecting the other ends of said springs with said body at points adjacent said ends, said springs constituting the sole means for connecting said body with said frame.

3. In an automobile, a frame comprising side members, wheels supporting said frame, an elongate body having a portion arranged between the side members of said frame and movable to a position below the same by the vertical movement of said body, and a pair of elongate springs mounted end to end on each side member and extending lengthwise thereof, the springs on each side member having their adjacent ends secured to said frame member and having their other ends connected with said body to support the same for vertical bodily movement with relation to said frame, said springs constituting the sole means for supporting said body on said frame.

4. In an automobile, a frame comprising side members, wheels to support said frame, a body having its lower portion arranged between said side members, adapted to be moved to a position below the same by the vertical movement of said body, a pair of springs mounted on each side member of said frame, extending lengthwise thereof in substantial alinement one with the other and having their adjacent ends secured thereto, and means for connecting the other ends of said springs with said body at points above the bottom thereof and spaced from the respective ends thereof, said springs supporting said body for vertical movement and for movement about a transverse axis with relation to said frame.

5. In an automobile, a frame comprising side members, wheels supporting said frame, a body having a lower portion extending between the side members of said frame, and an upper portion overhanging said frame members, and springs arranged alongside of and extending lengthwise of the respective side members of said frame, each spring having one end secured to the adjacent frame member and having its other end connected with the upper portion of said body.

6. In an automobile, a frame comprising side members, wheels supporting said frame, springs mounted on the respective side members of said frame, an elongate body supported by said springs and pivotally connected therewith for movement about a transverse axis adjacent the center of gravity of said body, and a plane connected with said body to elevate one end thereof and support the same for free pivotal movement on said axis.

7. In an automobile, a frame comprising side members, wheels supporting said frame, a spring extending lengthwise of each side member of said frame and having one end secured thereto, an elongate body arranged between said springs, means for pivotally mounting said body on the free ends of said springs for movement about a transverse axis adjacent the center of gravity of said body, and a plane connected with said body to elevate one end thereof and control the movement thereof about said axis.

8. In an automobile, a frame having side members, driving wheels, spring means for separately connecting said wheels with said frame for independent vertical movement with relation thereto, a body having a part arranged between the side members of said frame, springs supporting said body on said frame, an engine mounted on one of said side members exteriorly of said body, said engine having a shaft extending into said body, and a driving shaft connecting said engine shaft with one of said wheels, said body having openings through which said shafts extend to permit of the relative movement of said body and said shafts.

EDWARD T. TURNER.